United States Patent
Hein

(10) Patent No.: US 11,376,665 B2
(45) Date of Patent: Jul. 5, 2022

(54) PROCESSING TOOL AND A METHOD FOR ITS PRODUCTION BY MEANS OF AN ADDITIVE LAYER-WISE BUILDING PROCESS

(71) Applicant: EOS GmbH Electro Optical Systems, Krailling (DE)

(72) Inventor: Peter Hein, Schäftlam/Zell (DE)

(73) Assignee: EOS GmbH Electro Optical Systems, Krailling (DE)

( * ) Notice: Subject to any disclaimer, the term of this patent is extended or adjusted under 35 U.S.C. 154(b) by 820 days.

(21) Appl. No.: 16/088,535

(22) PCT Filed: Mar. 28, 2017

(86) PCT No.: PCT/EP2017/057272
§ 371 (c)(1),
(2) Date: Sep. 26, 2018

(87) PCT Pub. No.: WO2017/167726
PCT Pub. Date: Oct. 5, 2017

(65) Prior Publication Data
US 2019/0105711 A1    Apr. 11, 2019

(30) Foreign Application Priority Data
Mar. 28, 2017    (DE) .......................... 102016205147.4

(51) Int. Cl.
*B33Y 10/00*    (2015.01)
*B33Y 50/00*    (2015.01)
(Continued)

(52) U.S. Cl.
CPC ................ *B22F 10/20* (2021.01); *B22F 5/00* (2013.01); *B29C 64/153* (2017.08);
(Continued)

(58) Field of Classification Search
None
See application file for complete search history.

(56) References Cited

U.S. PATENT DOCUMENTS

| | | |
|---|---|---|
| 2012/0107496 A1 | 5/2012 | Thoma |
| 2014/0255647 A1 | 9/2014 | Johnson et al. |
| 2017/0087638 A1 | 3/2017 | Schmitt et al. |

FOREIGN PATENT DOCUMENTS

| | | |
|---|---|---|
| DE | 4001997 | 7/1991 |
| DE | 19724875 | 12/1998 |

(Continued)

OTHER PUBLICATIONS

Gibson, Ian, et al. Additive Manufacturing Technologies: Rapid Prototyping to Direct Digital Manufacturing. Springer, 2010. (Year: 2010).*

(Continued)

*Primary Examiner* — Anthony M Liang
(74) *Attorney, Agent, or Firm* — Seyfarth Shaw LLP

(57) ABSTRACT

Disclosed are mixtures for use in additive manufacturing, wherein the powder mixture comprises first and second materials. The first material includes a metal alloy or a mixture of elemental precursors thereof, and is in powder form. The second material includes a reinforcement material comprising powder particles having a particle diameter of from 1 to less than 30 µm (as determined by laser scattering or laser diffraction). The inventive powder mixtures allows for the processing to three dimensions objects which are free of cracking and which thus have favourable mechanical characteristics. Further disclosed are processes for the preparation of corresponding powder mixtures and three dimensional objects, three dimensional objects prepared accordingly and devices for implementing processes for the preparation of such objects, as well as the use of a corre- (Continued)

sponding powder mixture to supress crack formation in a three-dimensional object, which is prepared by additive manufacturing.

9 Claims, 5 Drawing Sheets

(51) Int. Cl.
*B22F 5/00* (2006.01)
*B22F 10/20* (2021.01)
*B33Y 30/00* (2015.01)
*B29C 64/386* (2017.01)
*B29C 64/153* (2017.01)
*B33Y 50/02* (2015.01)
*H04N 1/409* (2006.01)
*B22F 10/30* (2021.01)

(52) U.S. Cl.
CPC ............ *B29C 64/386* (2017.08); *B33Y 10/00* (2014.12); *B33Y 30/00* (2014.12); *B33Y 50/00* (2014.12); *B33Y 50/02* (2014.12); *B22F 10/30* (2021.01); *B22F 2005/001* (2013.01); *H04N 1/4092* (2013.01)

(56) References Cited

FOREIGN PATENT DOCUMENTS

| | | |
|---|---|---|
| DE | 19900597 | 6/2000 |
| DE | 102010019447 | 11/2011 |
| DE | 102014003726 | 9/2015 |
| EP | 3028839 | 6/2016 |
| GB | 2358829 | 8/2001 |
| JP | 2014065180 | 4/2014 |

OTHER PUBLICATIONS

International Search Report for Application No. PCT/EP2017/057272 dated Jun. 13, 2017, 2 pages.

Wikipedia (DE): Generatives Fertigungsverfahren. Version of Mar. 5, 2016 as found at: https://de.wikipedia.org/w/index.php?title=Additive_Fertigung&stableid=152211918 as retrieved on Feb. 2, 2017 (German), 6 pages.

Wikipedia (EN): 3D Printing. Version of Mar. 5, 2016 as found at: https://en.wikipedia.org/w/index.php?title=3D_printing&oldid=708484306 as retrieved on Sep. 17, 2018 (English), 16 pages.

* cited by examiner

PROCESSING TOOL AND A METHOD FOR ITS PRODUCTION BY MEANS OF AN ADDITIVE LAYER-WISE BUILDING PROCESS

TECHNICAL FIELD OF THE INVENTION

The present invention refers to a method for providing a set of control commands for the production of a processing tool by means of an additive layer-wise building device, to a respectively designed additive layer-wise building device for the production of the processing tool as well as to an additive layer-wise building method for producing the processing tool.

Processing tools for processing workpiece surfaces are normally used for several different types of workpieces. This universality of the applicability of the tools is a disadvantage if the workpiece surface to be processed has a complex shape or is difficult to access. In the latter cases, the processing process, in which the processing tool is moved over the workpiece surface, can prove to be very complicated or, in extreme cases, impossible.

It is therefore an object of the present invention to provide a processing tool and a method for producing the same by means of which also surfaces of a workpiece that have a very complex shape or are very difficult to access can be processed with little effort.

BACKGROUND OF THE INVENTION

According to the invention, a method of providing a control command set for producing a processing tool by means of an additive layer-wise building device comprises at least the following steps:
  providing computer-based model data representing at least one partial surface of an object, which partial surface is to be processed using the processing tool,
  generating a computer-based model of the processing tool having an interaction surface interacting with the at least one partial surface in the context of a processing process in such a way that the interaction surface is analogous in the geometric sense to the at least one partial surface of the object to be processed,
  generating a control command set for an additive layer-wise building device, by means of which control command set the production of the processing tool is implemented on the basis of the computer-based model of the processing tool comprising the interaction surface.

According to the invention, a processing tool for a workpiece is produced by means of an additive layer-wise building device. The selected production method makes it possible to produce with reasonable effort processing tools individually tailored to workpieces. According to the invention, by providing an appropriate control command set for the production of the processing tool, the additive layer-wise building device used is configured in such a way that an optimized processing tool can be produced.

According to the invention, the processing tool is provided with an interaction surface interacting with a partial surface of the workpiece, which interaction surface is geometrically adapted to the partial surface to be processed. The adaptation consists preferably in that the interaction surface is analogous or similar in the geometric sense to the partial surface of the workpiece to be processed. For example, if the partial surface to be processed has the shape of the curved surface of a hemisphere, according to the invention in this case the processing tool is provided with an interaction surface which is also hemispherical, however is concave in order to be able to interact with the convex hemispherical surface of the workpiece so that a processing of the partial surface is possible (analogously, the partial surface to be processed can also be concave and the interaction surface correspondingly convex). The interaction surface can be identical to the hemispherical surface of the workpiece but can also be larger or smaller than the surface to be processed by a certain percentage so that there is geometric similarity. Geometric similarity means that the partial surface to be processed and the interaction surface can be transformed into one another by means of a similarity transformation (not taking into account the fact that both surfaces can have different textures).

The processing tool can also be configured for processing a plurality of partial surfaces of a workpiece. In this case, the processing tool preferably has a corresponding number of interaction surfaces.

Furthermore, the partial surface to be processed does not necessarily need to be an external surface of the workpiece, but can also be a surface located inside, for example can be a part of the wall of a channel through the workpiece. In some circumstances, the partial surface to be processed can also be the entire surface of the workpiece. In order to allow an interaction between the processing tool and the workpiece in such a case, the processing tool can either be produced together with the workpiece to be processed so that the latter is completely enclosed by the processing tool, or the processing tool can be produced in parts and assembled on the workpiece to be processed after completion. However, the processing tool is preferred to be one piece.

Preferably, the processing tool is designed such that the interaction surface allows a surface processing of and/or fitting in a form-fitting manner to the at least one partial surface of the object to be processed.

A preferred application focus of the invention is to provide processing tools for a surface finishing of the workpiece. This includes, for example, smoothing processes of the workpiece surface, for example by grinding, polishing or rasping, wherein the interaction surface is moved parallel to the partial surface of the workpiece to be processed and in mechanical contact with it. Mechanical contact means that the interaction surface comes into contact at least with protrusions of the workpiece surface, which protrusions are undesirable and are to be removed from the workpiece surface. Furthermore, a processing tool could also have a cutting edge as interaction surface that is moved parallel to the workpiece surface to cut off protrusions on the workpiece surface and is matched with the shape of the workpiece surface.

SUMMARY OF THE INVENTION

Another group of processing tools to be preferably produced comprises tools whose interaction surface is fitted, i.e. formed, in a form-fitting manner to a partial surface of the workpiece, for example in order to exert (intermittently) uniform pressure onto the partial surface. This includes hammers or pressing tools.

The invention is particularly applicable in cases in which the at least one partial surface is located within a cavity in the object to be processed, which cavity is open in at least one direction, in particular is located within a channel through the object to be processed.

Cavities in objects tend to be difficult to access from outside of the object, even if they have one or more openings, i.e. are open in at least one direction. If, for example, an object's surface that is located within the cavity (i.e. a region of the cavity wall) is to be processed with a tool, the tool cannot be tilted, twisted or shifted at will relative to the surface, firstly because in some circumstances it is larger than the cavity itself, and secondly because when the tool is moved it hits the boundaries of the cavity at several points. No limits are set to the shape of cavities in objects. The inventive approach allows to form tools with a shape adapted for a processing within a specific cavity in an object.

Preferably, the processing tool is designed such that support structures generated inside the cavity can be removed after the production by means of an additive layer-wise building device of the object to be processed. In the additive layer-wise production of objects comprising cavities it is often necessary to apply support structures in a cavity in order to ensure the precise production of the cavity with the desired shape. These support structures are often not intended to remain in the cavity after completion of the object and therefore need to be removed again from the cavity. If a processing tool is adapted to the shape of the cavity, it is easier to remove a support structure (for example a rod network) from the cavity as the surface of the cavity is swept more uniformly during processing.

As already mentioned, the interaction surface does not necessarily need to be identical to the partial surface to be processed. Rather, its dimensions (preferably the majority of individual dimensions, particularly preferably all dimensions) may differ from the corresponding dimensions of the partial surface to be processed by a factor g different from 1. In this context, "dimension" refers to a parameter value related to a dimensional parameter such as a length, an angle, an area, a volume, a curvature, etc. Preferably, the majority, particularly preferably the entirety, of all dimensions in at least two spatial directions are altered by a factor g compared to the respective dimensions of the partial surface to be processed, furthermore, particularly preferably in all three spatial directions. The factor g can be chosen to be the same with regard to all dimensions, but can also differ locally so that a plurality of factors g are used. Altogether, this measure can take account of the fact that processing is sometimes easier if the interaction surface and the partial surface to be processed have slightly different sizes, for example differ by up to 10% in size, in particular by a factor g which is the same for all dimensions of the surfaces. In general, one can speak of a linear or weighted scaling.

Furthermore, the interaction surface can be provided with a surface texture which is different from the surface texture of the partial surface to be processed. By doing so, for example, the interaction surface can have a rougher surface than the partial surface to be processed, which is in particular useful for smoothing processes at the partial surface.

According to the invention, a device for providing a control command set for producing a processing tool by means of an additive layer-wise building device at least comprises:
- a provisioning unit which in operation provides computer-based model data representing at least one partial surface of an object, which partial surface is to be processed using the processing tool,
- a model generating unit for generating a computer-based model of the processing tool having an interaction surface interacting with the at least one partial surface in the context of a processing process in such a way that the interaction surface is analogous in the geometric sense to the at least one partial surface of the object to be processed, and
- a control command set generating unit which upon operation generates a control command set for an additive layer-wise building device, by means of which control command set the production of the processing tool is implemented on the basis of the computer-based model of the processing tool comprising the interaction surface.

In particular, the device according to the invention is suitable for implementing any of the variants of the inventive method for providing a control command set for the production of a processing tool by means of an additive layer-wise building device. The provisioning unit mentioned can be an input interface that can read data from a mobile data storage medium or receives data via a network or reads data directly from a database. In particular, apart from being implemented as a separate unit, the device can also be part of a more extensive EDP system (e.g. a CAD design system) or be integrated into an additive layer-wise building device. In the latter two cases, the provisioning unit is preferably a software interface that communicates with other system components. In particular, the device according to the invention does not necessarily need to be a part of an additive layer-wise building device. This is an advantage because, possibly, CAD data for an object to be processed are not available at the location of the additive layer-wise building device, but at the place where the object to be processed was designed. In particular, it is thus possible to design an object together with a dedicated processing tool designed for it.

It is advantageous to closely couple the inventive device for generating a control command set to the additive layer-wise building device for which the control command set is generated in order to be able to react quickly to technical constraints specified by the additive layer-wise building device.

According to the invention, an additive layer-wise building device for producing a number of three-dimensional objects, wherein the objects are produced layer by layer on a support by solidifying a building material, in particular a building material in powder form, comprises a device according to the invention for providing a control command set for producing a processing tool or is connected in terms of signaling to such a device.

It is advantageous to closely couple the inventive device for generating a control command set to the additive layer-wise building device, for which the control command set is generated in order to be able to react quickly to changes of the technical parameters of the additive layer-wise building device.

In an inventive production method of producing a processing tool by means of an additive layer-wise building device the additive layer-wise building device is controlled for the building process by means of a control command set provided by a method according to the invention. In the production method, preferably the processing tool and the object to be processed are produced in the same production process.

Although the inventive approach for producing processing tools for objects is not limited to objects that themselves were produced using an additive layer-wise building method, the production of an object and of the processing tool together in the same production process can be advantageous. For example, a production in the same additive layer-wise building process makes it possible to produce the processing tool in such a way that, after its completion, it is already positioned in a cavity of the object, which cavity is to be processed. Furthermore, the processing tool can preferably be positioned in the cavity of the object in such a way that it either serves as a support structure or is connected to the walls of the cavity via support structures during the production of the object. If then, for example, the processing tool is removed from the cavity, the support structures between the processing tool and the cavity walls are removed in the same process, which ultimately facilitates the removal of support structures from cavities after completion of the additive layer-wise building process.

Further preferred, in the production method according to the invention the at least one partial surface of the object to be processed and the interaction surface have substantially the same horizontal orientation during production.

To ensure that the object's partial surface to be processed and the interaction surface of the processing tool are as identical or geometrically similar as possible, it is advantageous if both have substantially the same horizontal orientation during their production by means of an additive layer-wise building method, since in this case distortion effects that occur during the additive production are very similar to one another.

In the production method according to the invention, preferably a metal powder is used as a building material in the additive layer-wise building method. Especially in the production of objects from a metal it is often difficult to process, for example smoothen, the surface due to the hardness of the material. In this case, in order to avoid damage caused by the high forces exerted, it is advantageous to match the interaction surface to the partial surface to be processed in accordance with the invention.

According to the invention, a processing method of processing a three-dimensional object by use of a processing tool comprises the steps of producing the processing tool with by means of a production method according to the invention and processing the three-dimensional object with the processing tool. In this case, the use of an additive layer-wise building method for the production of the processing tool enables in particular its purposeful production for a specific processing process at a specific object within a short time.

Preferably, the processing method is a method in which the interaction surface of the processing tool is made to interact with the corresponding partial surface of the three-dimensional object at least temporarily. A processing action according to the invention can, for example, be a grinding or smoothing of the partial surface of the object. As already mentioned above, the processing step can also be a hammering or a pounding process or a pressing process.

According to the invention, a computer program comprises a sequence of commands, by which commands a method according to the invention for providing a control command set and/or a production method according to the invention is implemented when the commands are executed.

The implementability of the inventive method for generating a control command set by means of software makes it easy to install on different EDP (electronic data processing) systems at different locations (for example, at the creator of the design of the object to be processed or at the user looking for a suitable processing tool for the object). By producing the processing tool using an additive layer-wise building production, the method according to invention is particularly advantageous for the user of objects to be processed, since this allows for a post-treatment of the object or minor modifications to the object within a short time.

BRIEF DESCRIPTION OF THE DRAWING

In the following, the invention is described with the aid of the figures. The figures show.

DETAILED DESCRIPTION OF THE EMBODIMENTS

Figure 1:
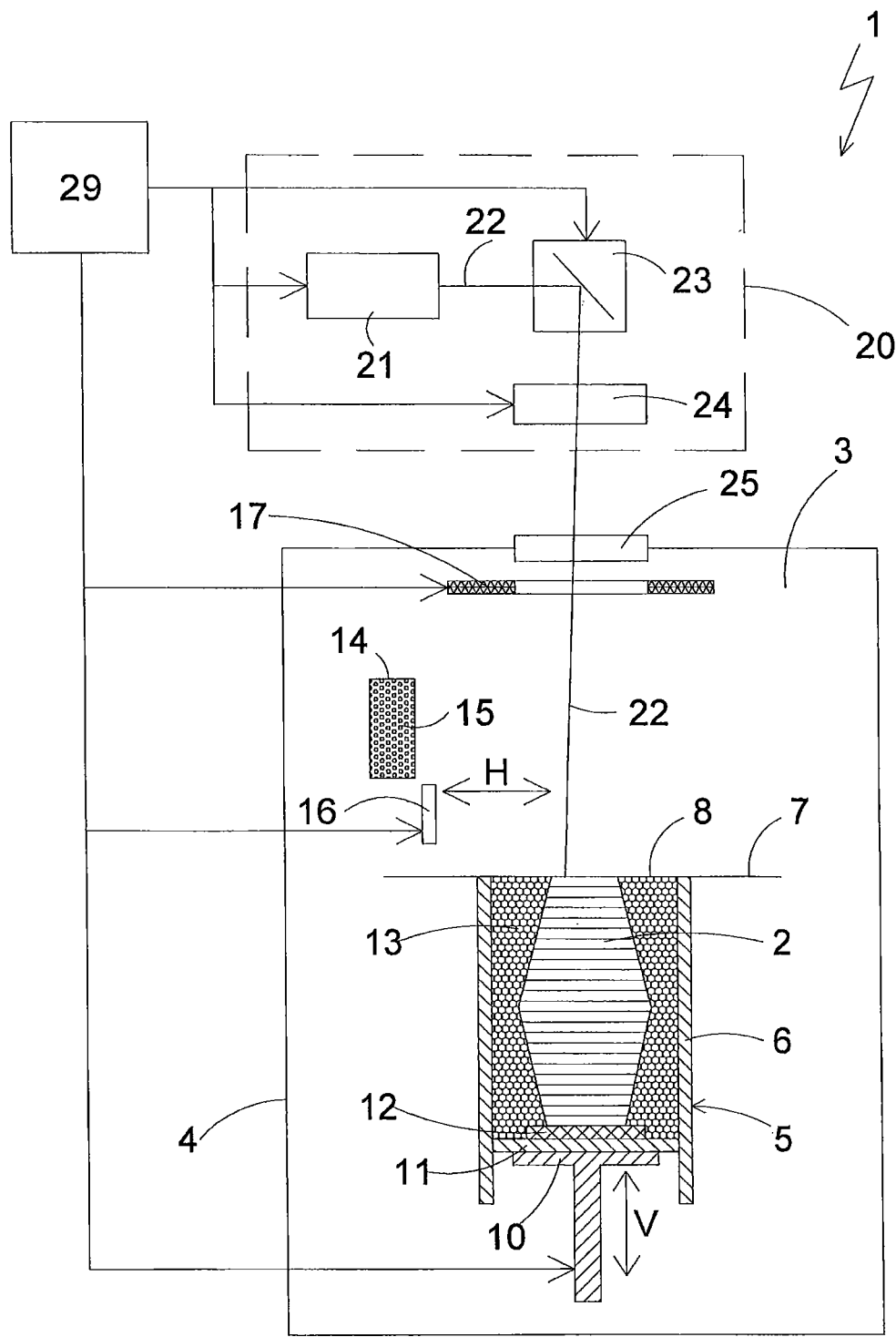
FIG. 1 shows an example of a device for the layer-wise production of three-dimensional objects from a powder material according to an exemplary embodiment of the invention.

Hereafter, a laser sintering device or laser melting device 1 is described with reference to FIG. 1 as an example of an additive layer-wise building device by means of which the inventive method for producing a processing tool can be implemented. The device shown is thus also an example of an inventive building device for a processing tool.

For building an object 2, the layer-wise building device comprises a process chamber 3 with a chamber wall 4. A container 5 open to the top with a container wall 6 is arranged in the process chamber 3. A working plane 7 is defined by the vertical position of the upper opening of the container 5, wherein the area of the working plane 7 located within the opening, which area can be used for building the object 2, is referred to as build area 8.

In the container 5, a support 10 is arranged that can be moved in a vertical direction V and to which a base plate 11 is attached which seals the container 5 at the bottom and thus forms the bottom thereof. The base plate 11 can be formed as a plate separately from the support 10 which plate is fixed to the support 10, or it can be integrally formed with the support 10. Depending on the powder and process used, a building platform 12 can also be arranged on the base plate 11 on which the object 2 is built. However, the object 2 can also be built on the base plate 11 itself, which then serves as a building platform. In FIG. 1, the object 2 to be formed in the container 5 on the building platform 12 is shown below the working plane 7 in an intermediate state with several solidified layers, surrounded by building material 13 that remained unsolidified.

The laser sintering device 1 further comprises a storage container 14 for a building material in powder form 15 that can be solidified by electromagnetic radiation and a recoater 16 that can be moved in a horizontal direction H for applying building material 15 to the build area 8. Furthermore, an (optional) radiant heater 17 is arranged in the process chamber for preheating the building material 15 applied to the build area 8. The radiant heater 17 is designed as an infrared heater, for example.

The laser sintering device 1 further comprises an irradiation device 20 with a laser 21 which produces a laser beam 22 which is deflected by a deflection device 23 and focused upon the working plane 7 by way of a focusing device 24 through a coupling window 25 that is arranged on the upper side of the process chamber 3 in the chamber wall 4.

Furthermore, the laser sintering device 1 comprises a control unit 29 by which the individual components of the device 1 can be controlled in a coordinated manner in order to implement the building process. The control unit can also be arranged partially or completely outside of the device. The control unit can comprise a CPU, the operation of which is controlled by a computer program (software). The computer program can be stored separately from the device on a storage medium from which it can be loaded into the device, in particular into the control unit 29.

During operation, for applying a powder layer, the support 10 is first lowered by an amount that corresponds to the desired thickness of the layer. The recoater 16 first moves to the storage container 14 and therefrom receives an amount of building material 15 sufficient for applying a layer. Then it moves across the build area 8 and there applies a thin layer of the building material in powder form 15. Application takes place at least over the entire cross-section of the object 2 to be produced, preferably over the entire build area 8, i.e. that area of the working plane 7 below which the support is lowered vertically. The building material in powder form is then optionally preheated by the radiant heater 17. When a working temperature is reached, the cross-section of the object 2 to be produced is scanned by the laser beam 22 so that the building material in powder form 15 is at least partially melted by means of heat supply at the positions that correspond to the cross-section of the object 2 to be produced so that it is solidified after cooling, i.e. has coalesced to form a solid body. These steps are repeated until the object 2 is completed and can be removed from the process chamber 3.

All powders and powder mixtures suitable for the laser sintering process or laser melting process can be used as building material in powder form. Such powders include, for example, plastic powders such as polyamide or polystyrene, PAEK (polyaryl ether ketones), elastomers such as PEBA (polyether block amides), plastic-coated sand, ceramic powders or metal powders such as stainless steel powders or other metal powders adapted for the respective purpose, in particular alloys.

In the additive layer-wise building device described above as an example, the control device 29 is adapted such that the inventive method for producing a processing tool can be carried out in the layer-wise building device. A building process is carried out in such a way that the control unit 29 processes a control command set which are instructions to apply layers of the building material one after the other and to selectively irradiate areas of the respective layers that correspond to the cross-section of an object to be produced with the laser radiation. The control command set therefore comprises information about the positions to be solidified within a layer and the type of decomposition of the object to be produced into layers.

In detail, the control command set is based on a computer-based model of the object or objects to be produced, preferably a CAD volume model. Furthermore, the control command set also includes production specific information, such as the position and orientation of the objects in the container 5. Finally, the control command set also contains the layer information, i.e. how the object or objects to be produced are sectioned into layers that correspond to the layers of building material during the layer-wise additive production. The control command set defines for each layer of the building material in particular the thickness of the layer application and the positions at which the building material is to be solidified by supply of radiation during the production. In particular, the control command set also contains all data required to control the irradiation device, by means of which, among other things, the energy density of the radiation emitted by the irradiation device and, if necessary, the scanning speed of the beam across the build area 8 are defined.

The method according to the invention is described in the following by way of example with reference to FIGS. 2 to 5.

Figure 2:
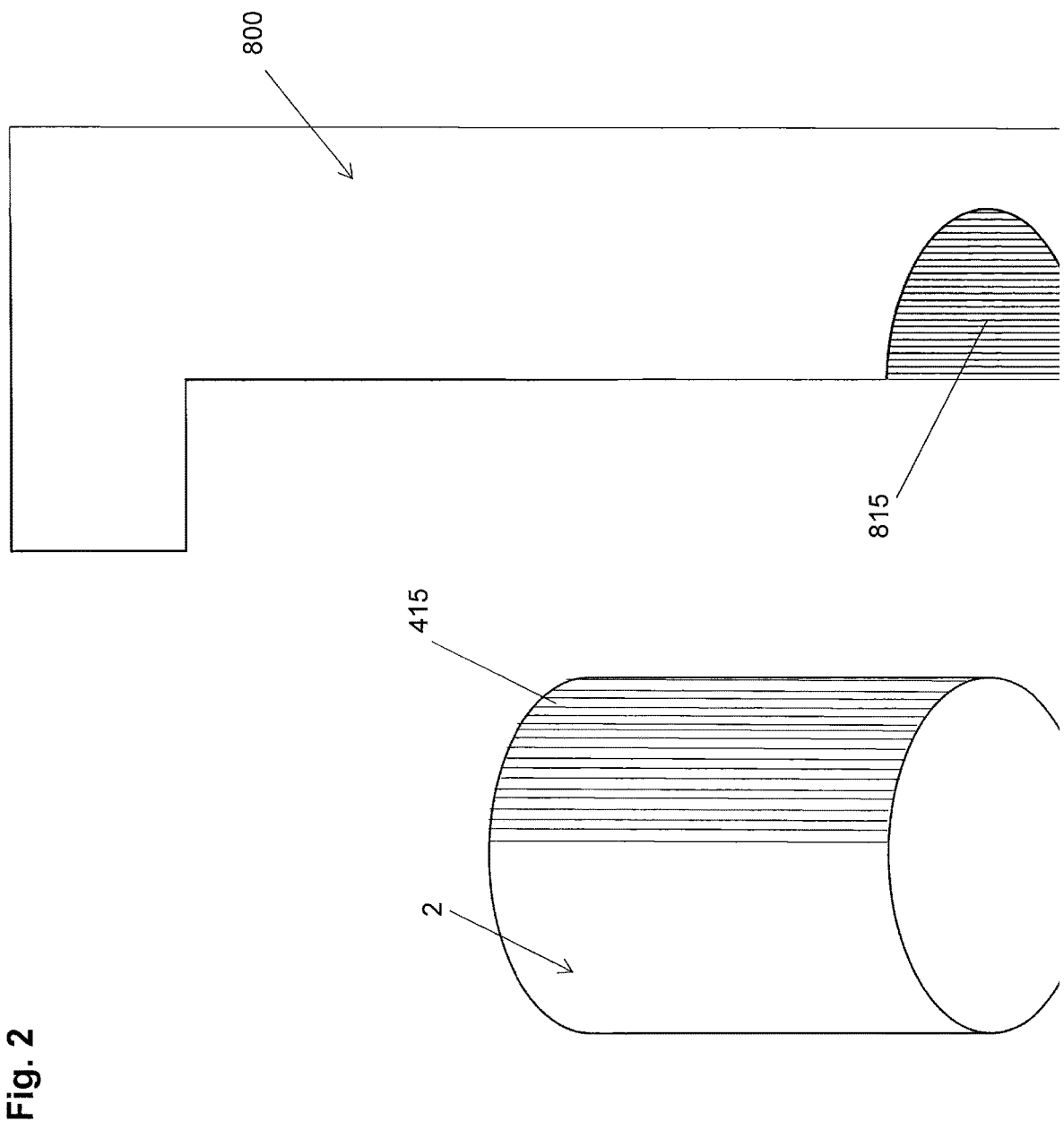
FIG. 2 shows a three-dimensional depiction of an object together with the inventive processing tool adapted thereto, FIG. 3 schematically depicts a method according to the invention for providing a control command set for an additive layer-wise building device and FIG. 4 schematically shows the structure of a device for providing a control command set for the production of a processing tool according to the present invention
Figure 3:
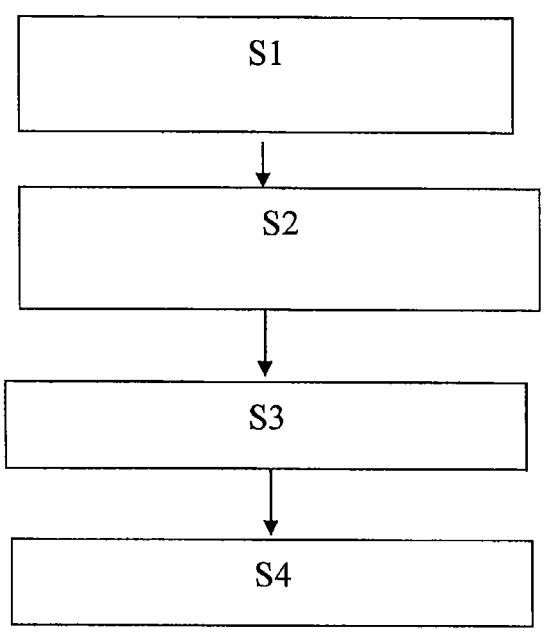
Figure 4:
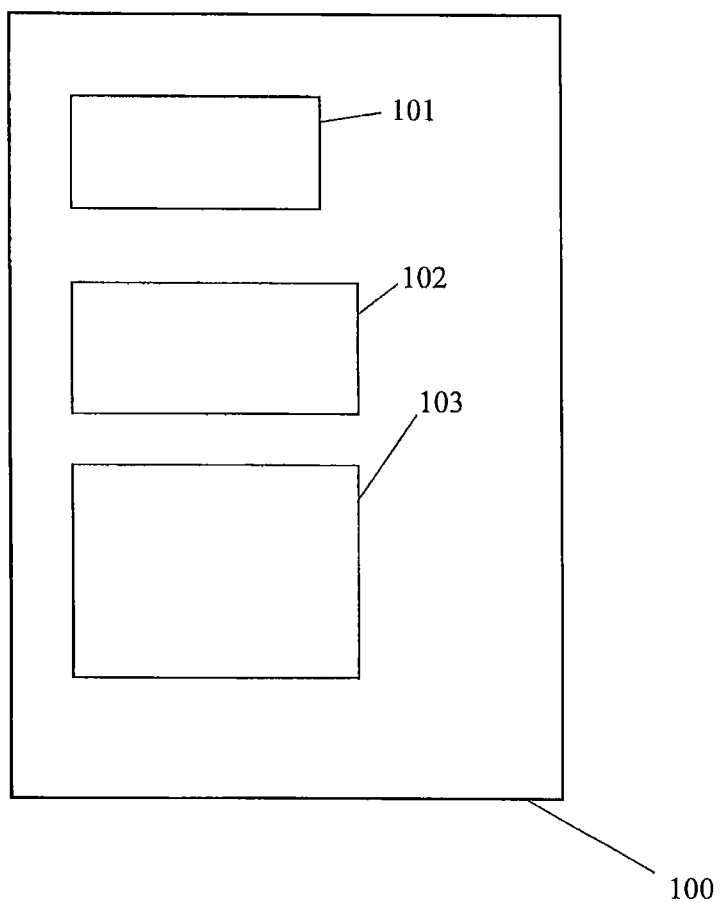

As shown in FIG. 4, according to the invention, the device 100 for providing a control command set for a specific additive layer-wise building device comprises a provisioning unit 101, a model generating unit 102 and a control command set generating unit 103. The mode of operation of the device 100 for providing a control command set is described with reference to FIG. 3. Here, FIG. 2 shows a specific exemplary embodiment.

First, the provisioning unit 101 receives (CAD) model data MD of an object to be processed by a processing tool (step S1 in FIG. 3). The provisioning unit 101 can obtain the model data either by accessing a data memory or via a network or a mobile data storage medium. In particular, the provisioning unit 101 can access a database storage directly or access a database via a network. The model data do not necessarily need to represent the entire object to be processed. However, they must represent at least a partial surface of the object with which partial surface the processing tool is to interact. FIG. 2 shows a cylinder as an example of the object 2 to be processed.

Next, the model generating unit 102 identifies those sub-data of the model data that represent the at least one partial surface of the object, which partial surface is to be processed with the processing tool (step S2 in FIG. 3). In doing so, the shape, size and position of the partial surface on the object to be processed can already be indicated in the model data or a user of the device 100 can interactively specify the shape, size and position of the partial surface on the object to be processed by a user input at an input interface that is optionally connected to the device 100, whereupon the sub-data corresponding to the specification are identified in the model data MD. In the example of FIG. 2, the partial surface 415 to be processed is the right half of the cylinder surface drawn with vertical lines (only that part of the partial surface to be processed can be seen that is facing the viewer).

Subsequently, the model generating unit 102 makes a copy of the data which represent the partial surface and integrates the resulting data (hereinafter referred to as interaction data) into model basic data of the processing tool (step S3 in FIG. 3) such that the inside and outside of the original partial surface are reversed. The model basic data of the processing tool are data that represent a basic shape of the processing tool defined in advance.

In the example in FIG. 2, the basic shape of the processing tool 800 is a rod shape. In FIG. 2, one recognizes (marked by lines and only partially recognizable) the interaction surface 815 as a copy of the partial surface 415. In particular, one recognizes that by integrating the interaction data into the basic model data, the basic shape (i.e. the rod shape) was modified so that it now has a partial surface (interaction surface) 815 that is a counter-shape (or complementary shape) to the partial surface 415 to be processed. The concave interaction surface 815 is thus identical to the partial surface 415 except for the fact that the inside and outside are reversed, i.e. the outward-facing normal vector to the surface has changed its direction by 180° at all positions.

In some cases, a counter-shape of a surface in space can be determined by reversing the signs of all section curvatures at each point of the surface. However, such a description encounters difficulties, for example if the partial surface is a cube-shaped protrusion. Such a case of a partial surface with corners and edges is also covered by the invention, which is why the procedure according to the invention is described by the terms "counter-shape" or "complementary shape" or "in the geometric sense analogous shape", which also describe, for example, a cube-shaped recess as an interaction surface.

The exact position of the interaction surface on the processing tool can already be specified in the model basic data of the processing tool, or a user of the device 100 can interactively specify the position of the interaction surface on the object to be processed by means of an input at an input interface optionally connected to the device 100.

As soon as a complete computer-based model of the processing tool is available, a control command set is generated by the control command set generating unit 103 (step S4 in FIG. 3) into which set the model data of the processing tool are integrated so that an additive layer-wise building device can produce the processing tool when the control command set is processed. It should be noted here that those parameters that are independent of the model data of the processing tool and which are defined in the control command set are usually default for a specific additive layer-wise building device and can be adopted into the control command set for the production of a specific object regardless of the shape of the object to be produced. As soon as a corresponding control command set is available, the processing tool can be produced in the associated additive layer-wise building device and, after its completion, can be used for processing the object to be processed using the interaction surface of the processing tool.

In a modification of the method, the model basic data do not describe a basic shape of the processing tool having a specific geometry (having a handle, for example) in all its details. Rather, in this modification of the method, a user merely specifies basic geometries for the overall shape of the processing tool (for example: cylindrical shape, cuboid shape, conical shape, etc.). The inventive device for providing a control command set then always integrates the interaction data into the set of interaction data at a predetermined fixed position specified in the model basic data of the processing tool, in the case of the cone shape as the basic shape of the processing tool, for example, always at the base of the cone.

In a further modification, no model basic data of the processing tool are available initially. Rather, a shape of the processing tool is generated after determining the interaction surface, which shape is matched with the shape of the interaction surface. Such an approach is possible, in particular in the exemplary embodiment described below with reference to FIG. 5, but not only there.

Figure 5:
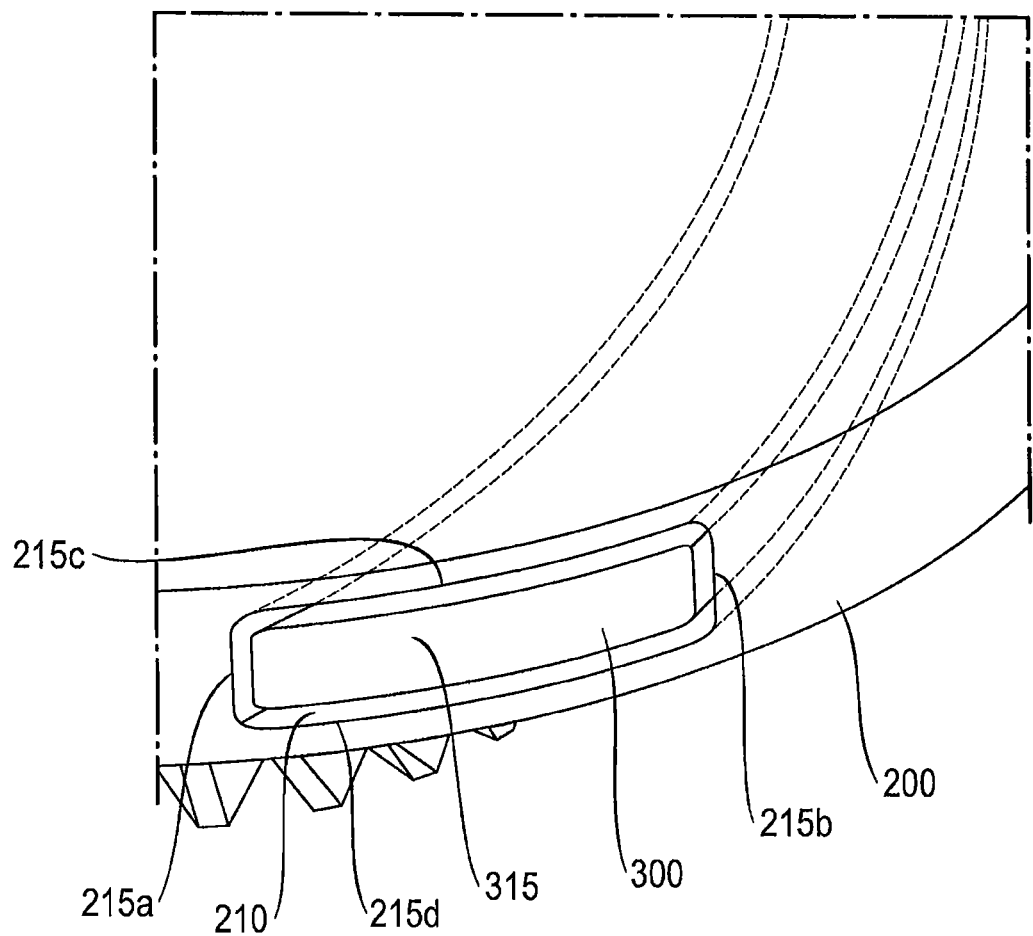
FIG. 5 shows a further example of an object together with the inventive processing tool adapted to the object.

FIG. 5 shows a part of the object 200 having a recess 210 shaped like a segment of an annulus and a processing tool 300 adapted to it. According to the invention, in the method for providing a control command set, first those sub-data are determined in a (CAD) model of the object 200 that represent the sidewalls 215*a* to 215*d* of the cavity 210 in object 200. To obtain the interaction surface data for the processing tool, first a copy of this sub-data is made and subsequently multiplied by a size change factor g, which is a number slightly smaller than 1, such that the resulting interaction data represent a surface which is smaller by the size change factor g in all its dimensions than the original surfaces 215*a* to 215*d*.

As can be seen in FIG. 5, the surface 315 defined in this way is the surface of a segment of an annulus. In order to completely define the shape of the processing tool 300, according to this embodiment, the end faces of the segment of the annulus are determined such that they substantially coincide with the (open) ends of the cavity 210 in the object. Therefore, by doing so, no basic shape of the processing tool needs to be defined in advance.

After its production by means of an additive layer-wise building device that processes the control command set provided by the device 100, the processing tool 300 described above and shaped like a segment of an annulus can now be driven into the cavity 210 of the object like a chisel in order to remove protrusions on the walls of the cavity 210. This is in particular necessary if the object 200 itself was produced using an additive layer-wise building method and support elements were formed in the cavity during the building process, which support elements need to be removed again after completion of the object 200. Despite the complicated shape of the cavity 210, the adapted shape of the processing tool 300 allows a precise interaction of the interaction surface 315 with the walls 215*a* to 215*d* of the cavity 210 so that the support elements or remnants of them are effectively removed from the cavity.

In a particular embodiment of the procedure described with reference to FIG. 5, the processing tool 300 is manufactured together with the object 200 by means of an additive layer-wise building method. In this method, the control command set is defined so that the processing tool 300 is produced in the cavity 210 together with the object 200. Optionally, support elements can be formed between the processing tool 300 and the walls 215*a* to 215*d* of the cavity during the additive layer-wise production. In this way, the processing tool 300 itself, together with these support elements (not shown), serves to stabilize the cavity 210 during the production of the object 200. In order to remove the support elements from the cavity after completion of the object 200, it is merely required to hit the end face of the processing tool 300, whereby the processing tool 300 is driven out of the cavity 210 together with the support elements. The specific shape of the interaction surface 315 thus allows the inner surface of the cavity 210 to be freed of support elements in a simple and smart manner.

In a modification of the invention, the interaction surface of the processing tool is provided with a specific surface texture prior to its production. For example, a saw-tooth structure or another rough surface texture can be specified accordingly in the model data of the processing tool and the processing tool can then be produced with such a modified surface. In this way it is possible, for example, to produce grinding or polishing tools that are specially adapted to an object's partial surface to be processed.

Although a laser-sintering device is described above as an example of an additive layer-wise building device, the method according to the invention can also be applied to other layer-wise building devices and methods, respectively. Examples include laser melting, LLM (cutting from a film and gluing), FLM (applying a thermoplastic material from a nozzle), 3D-printing, mask sintering methods and stereolithographic methods.

Furthermore, the invention is not limited to the conception, production and the processing process of a single object at a time. If several (e.g. different) objects are produced simultaneously, the method according to the invention can be implemented in the same way, including all its modifications.

Finally, it should be noted that a device 100 for providing a control command set for an additive layer-wise building device can be implemented not only by software components alone, but also by hardware components alone or by combinations of hardware and software. In particular, interfaces mentioned in the present application do not necessarily need to be implemented as hardware components, but can also be implemented as software modules, for example, if the data fed in or output via them can be taken over from other components already implemented on the same device or only have to be transferred to another component by software. The interfaces can also consist of hardware and software components, such as a standard hardware interface, which is specially configured by software for the specific application. In addition, several interfaces can also be combined in a common interface, for example an input-output interface.

The invention claimed is:

1. A production method of producing a processing tool by an additive layer-wise building device, wherein for a building process the additive layer-wise building device is controlled by a control command set provided by a method comprising at least the following steps:
providing computer-based model data representing at least one partial surface of an object that is to be processed using the processing tool;
generating a computer-based model of the processing tool having an interaction surface designed to interact with the at least one partial surface so as to process the at least one partial surface after manufacture of the object, wherein the interaction surface is designed so as to be geometrically analogous to the at least one partial surface of the object to be processed; and
generating a control command set for the additive layer-wise building device, the control command set implementing production of the processing tool based on the computer-based model of the processing tool that includes the interaction surface.

2. The production method of claim 1, wherein the processing tool and the object to be processed are produced in a same production process.

3. The production method of claim 2, wherein the at least one partial surface and the interaction surface have a same horizontal orientation during production.

4. The production method of claim 1, wherein the additive layer-wise building process uses a building material and wherein the building material is a metal powder.

5. The production method of claim 1, wherein the processing tool is designed such that the interaction surface allows a surface processing of and/or fitting in a form-fitting manner to the at least one partial surface of the object to be processed.

6. The production method of claim 1, wherein the at least one partial surface is located within a cavity in the object to be processed, the cavity being located within a channel through the object to be processed.

7. The production method of claim 6, wherein the processing tool is designed such that support structures generated inside the cavity can be removed after the additive layer-wise building device produces the object.

8. The production method of claim 1, wherein all dimensions in at least one spatial direction of the interaction surface differ by a factor g, which is different from the corresponding dimensions of the partial surface to be processed.

9. The production method of claim 1, wherein the interaction surface includes a surface texture that is different from a surface texture of the partial surface to be processed.

* * * * *